(12) United States Patent
Wang et al.

(10) Patent No.: US 7,010,625 B2
(45) Date of Patent: Mar. 7, 2006

(54) DISK ADMINISTRATING SYSTEM FOR MULTIPLE DISK-ARRAYS

(75) Inventors: Jerry Wang, Taipei (TW); Wilson Hu, Taipei (TW)

(73) Assignee: Via Technologies, Inc., Taipei (TW)

( * ) Notice: Subject to any disclaimer, the term of this patent is extended or adjusted under 35 U.S.C. 154(b) by 241 days.

(21) Appl. No.: 10/617,854

(22) Filed: Jul. 14, 2003

(65) Prior Publication Data

US 2004/0117550 A1    Jun. 17, 2004

(30) Foreign Application Priority Data

Dec. 12, 2002   (TW) ................................ 91135912 A

(51) Int. Cl.
*G06F 13/00*   (2006.01)
(52) U.S. Cl. .............................. 710/8; 710/62; 710/72; 710/74; 711/114; 711/170
(58) Field of Classification Search ................ 710/8, 710/10, 62, 72, 74; 711/114, 110, 154, 170; 714/5–7, 770

See application file for complete search history.

(56) References Cited

U.S. PATENT DOCUMENTS

| 5,537,567 | A | * | 7/1996 | Galbraith et al. | 711/114 |
| 5,822,782 | A | * | 10/1998 | Humlicek et al. | 711/170 |
| 5,835,694 | A | * | 11/1998 | Hodges | 714/6 |
| 5,950,230 | A | * | 9/1999 | Islam et al. | 711/156 |
| 6,742,081 | B1 | * | 5/2004 | Talagala et al. | 711/114 |

* cited by examiner

*Primary Examiner*—Kim Huynh
(74) *Attorney, Agent, or Firm*—Rosenberg, Klein & Lee

(57) ABSTRACT

A disk administrating system is provided for administrating multiple disk-arrays containing at least one disk array. The disk administrating system comprises a computer with an interface card and a plurality of disk drives connected to the computer through the interface card. Part of the plurality of disk drives constitute to at least one disk array. The disk in the disk array has an array configuration sector located at the last sector thereof and storing array configuration information therein. The computer accesses the disk through the interface card and manages the disk array by information stored in the array configuration sector.

7 Claims, 4 Drawing Sheets

DISK ADMINISTRATING SYSTEM FOR MULTIPLE DISK-ARRAYS

BACKGROUND OF THE INVENTION

1. Field of the Invention

The present invention relates to a disk administrating system for administrating disk in disk array, more particularly to a disk administrating system for multiple disk-arrays, the array configuration sector placed at the last sector of a disk in a disk array.

2. Description of Related Art

The rapid market growth of information products has urged the development of new technologies and new specifications in information industry. As to data storage device, the data transfer rate and data safety are important issues. Therefore, RAID (redundant array of independent disk) is proposed to meet above demands. RAID 0 (Redundant Arrays of Inexpensive Disks level 0) array provides the function of data striping to boost the data access speed. RAID 1 array provides the function of data mirroring to ensure security and safety of data storage and system stability. In addition, RAID 0+1 array, a combination of RAID 0 array plus RAID 1 array, has advantages in both data transfer speed and data security.

FIG. 1 shows a schematic view of a disk array 14 connected to a computer 12. The disk array 14 mainly comprises a disk-array controller 141, a plurality of disk drives including a first disk drive 161, a second disk drive 162, a third disk drive 165 and a fourth disk drive 167, connected to the computer 12 through the disk-array controller 141. Similarly, the computer 12 accesses the plurality of disk drives through the disk-array controller 141.

In prior art disk array, the disk of each disk driver has a sector arrangement as shown in FIG. 2. The first sector of each driver is configured as an array configuration sector 221 for the disk driver in which the configuration of the disk array is stored. The sector next to the array configuration sector 221 is configured as MBR (master boot record) sector 223. The remaining sectors are configured into a plurality of data sectors begun from a first data sector 225 and ended by a last data sector 229.

The disk array architecture and sector arrangement described above are only feasible for single disk array system and are problematic for multiple disk-array system (a system with multiple disk arrays). The placement of array configuration sector in first sector of the disk precludes the possibility for stand-alone use. Once being removed from the disk array, the data in the disk cannot be accessed.

SUMMARY OF THE INVENTION

It is an object of the invention to provide a disk administrating system for multiple disk-array to provide more flexible use for disk of the system.

In one aspect of the invention, a computer can identify and access disk in disk array/span array through an interface card with the help of the disk administrating system.

In another aspect of the invention, an array configuration is stored in last sector of each disk in a disk array to prevent data crash.

In still another aspect of the invention, the array configuration comprises an array signature field to identify a disk being an array disk or not.

In still another aspect of the invention, the array configuration comprises an array broken flag to test the integrity of array.

To achieve above object and aspects, A disk administrating system for administrating disk in disk array containing at least one disk array, the disk administrating system comprising a computer with an interface card; a plurality of disk drives connected to the computer; wherein at least part of the plurality of disk drives constitute to at least one disk array, the disk in the disk array has a last sector stored with an array configuration, wherein the computer accesses the disk through the interface card with reference to the array configuration sector.

The various objects and advantages of the present invention will be more readily understood from the following detailed description when read in conjunction with the appended drawing, in which:

DETAILED DESCRIPTION OF THE INVENTION

Figure 1:
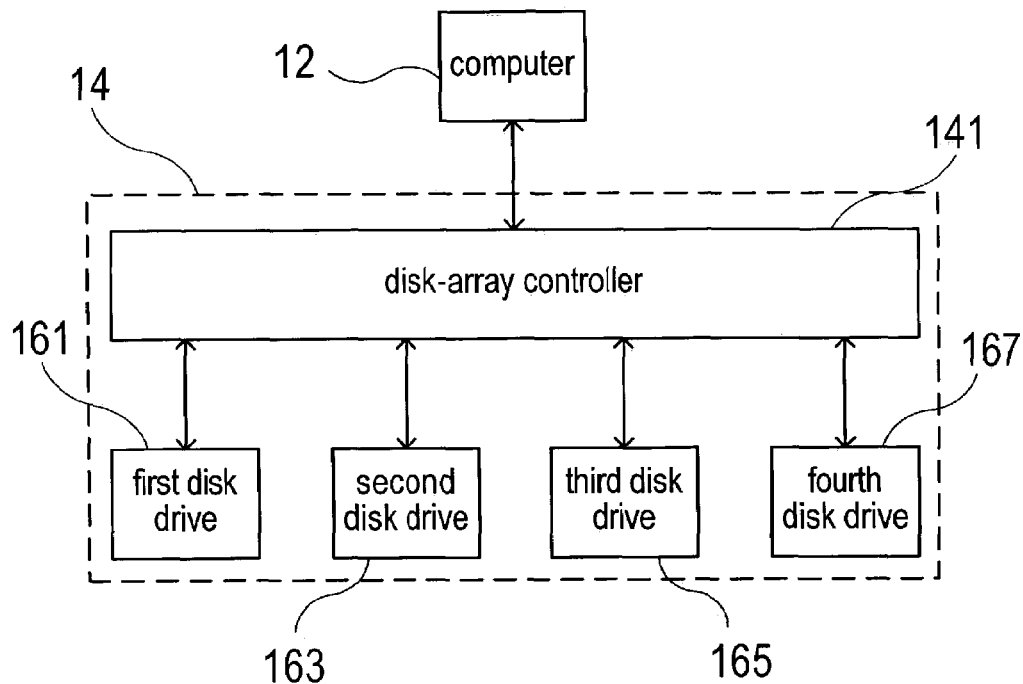
FIG. 1 shows a schematic view of prior art disk array.
Figure 2:
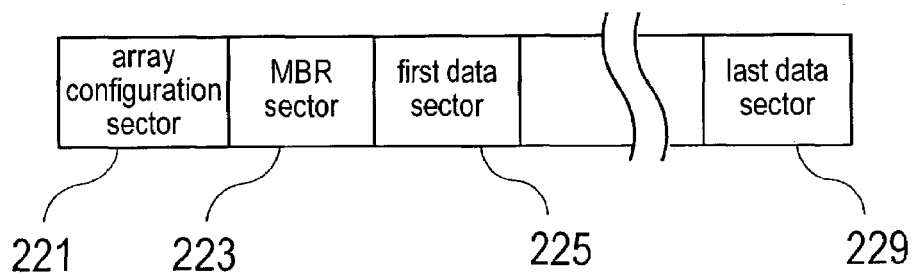
FIG. 2 shows the sector arrangement of prior art disk array.
Figure 3:
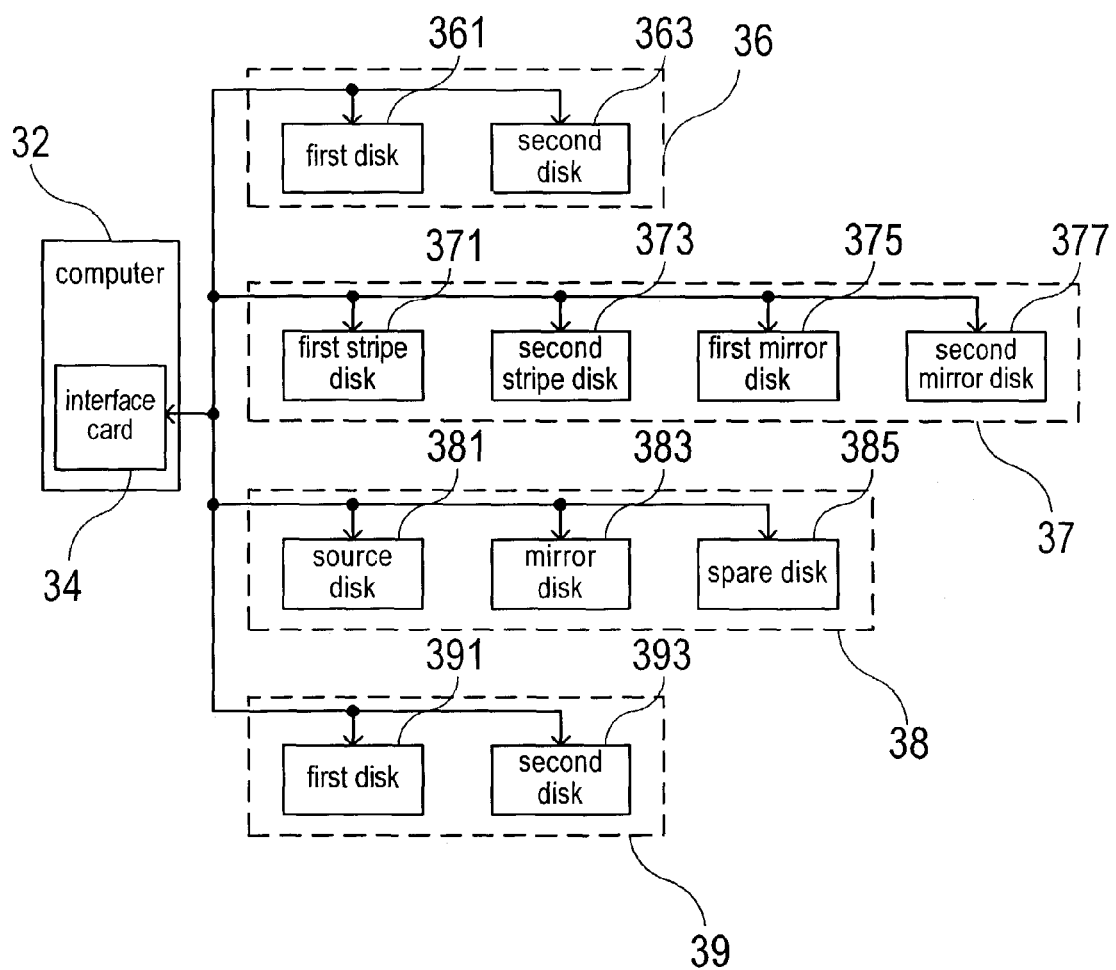
FIG. 3 shows a schematic block diagram of a multiple disk-array system.

FIG. 3 shows a schematic block diagram of a multiple disk-array system used to explain the disk administrating system for multiple disk-arrays according to the present invention. In this system, a computer 32 is connected to a plurality of disk arrays and a plurality of independent disk drives in a span array through an interface card 34. The plurality of disk arrays includes a first disk array 36, a second disk array 37, a third disk array 38 and a span array 39. To access data in the disks of the disk arrays or the span array, the computer firstly finds an accessing address of the data in corresponding disk, and then accesses the disks of the disk arrays or the span array through the adaptor card 34.

The plurality of disk arrays can be disk arrays of the same category or disk arrays of different categories. The first disk array 36 is a RAID 0 array which includes a first stripe disk 361 and a second stripe disk 363. The second disk array 37 is a RAID 0+1 array, which comprises a first stripe disk 371, a second stripe disk 373, a first mirror disk 375, and a second mirror disk 377. The third disk array 18 is a RAID 1 array, which comprises a source disk 381, a mirror disk 383, and a spare disk 385. The disk drives in the span array include a first disk drive 391 and a second disk drive 393.

Figure 4:
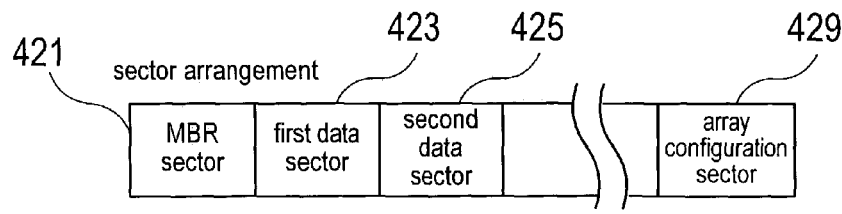
FIG. 4 shows the sector arrangement for each disk in the multiple disk-arrays system.

FIG. 4 shows the sector arrangement for each disk in the multiple disk-arrays system according to the present invention. In sector arrangement of disk in prior disk array system, the first sector is configured as the array configuration sector. In the present invention, the first sector is configured as the MBR sector, and following sectors are first data sector 423, second data sector 425, etc. In the present invention, the last sector for each disk in the disk array is array configuration sector 429 and used for storing array configuration.

When a data is to be written in to a disk, the sectors at front portion of the disk are firstly accessed. Therefore, the last sector has the minimal possibility to access. When the array configuration is stored in the last sector of a disk in a disk array such as RADD 1 array, the disk can be removed and used as independent disk. A disk already stored with data can also be safely added to a disk array such as RADD 1 array. The original data stored in the disk added to the disk array will not be ruined. Therefore, the arrangement of the array configuration in the last sector of a disk renders the disk with flexible usage.

Figure 5:
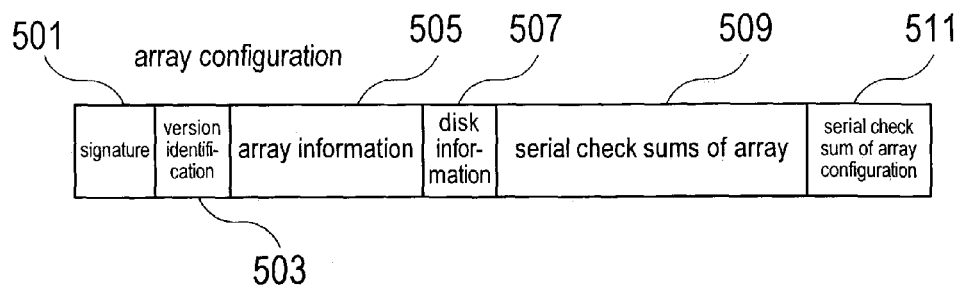
FIG. 5 shows the array configuration according to the present invention.

FIG. 5 shows the array configuration, which comprises an array signature field 501, a version identification 503, an array information 505, a disk information 507, a plurality of serial check sums 509 of every disk in the same disk array, and a serial check sum 511 of the array configuration.

The array signature field 501 is stored in offset 0 position of the array configuration with the data type of one word (16 bits). The array signature field is stored with a specific numeric value (such as AA55h) to identify a disk in a disk array. For example, if one word of data, started from offset 0 of the array configuration stored in the last sector of a disk, is stored with the numeric value AA55h, the disk belongs to a disk array. The version identification 503 is used to record the version of firmware or software in the disk array system. The array information 505 is used to record data and status of the disk array. The disk information 507 is used to record data and status of the disk in the disk array. The serial check sum 509 of each disk is obtained according to an operation on the model number, serial number, and firmware revision number of the disk. The computer 32 can recognize the sequence, the function and the relevant data of disks in a disk array by the serial check sum 509 of each disk. The serial check sum 511 of the array configuration is obtained according to an operation on the whole disk array. The serial check sum 511 of the array configuration is placed at the last portion of the array configuration to test the correctness of the disk array.

Figure 6:
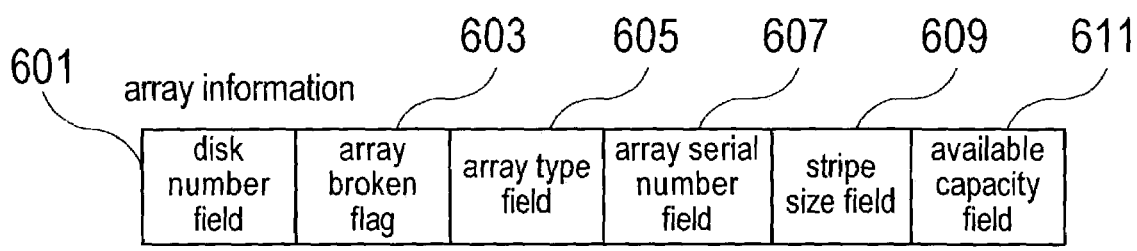
FIG. 6 shows the array information according to the present invention.
Figure 7:
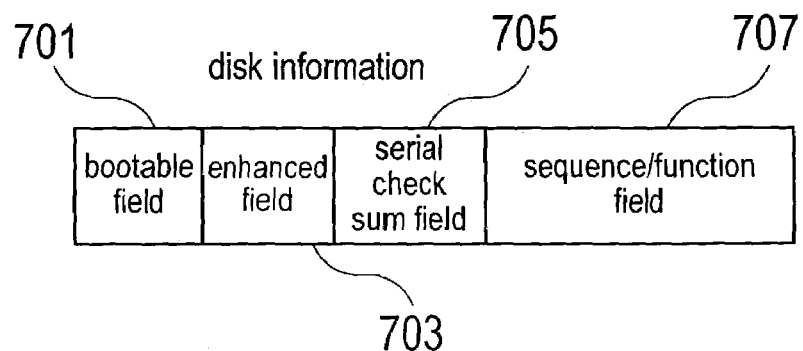
FIG. 7 shows the disk information according to the present invention.

FIG. 6 and FIG. 7 respectively depict the array information of each disk array and the disk information of each disk in the array configuration in more detail. The array information is used for storing relevant data and status in the disk array and composed of disk number field 601, array broken flag 603, array type field 605, array serial number field 607, stripe size field 609 and available capacity field 611. The disk information is used for storing relevant data and status in the disk and composed of bootable field 701, enhanced field 703, serial check sum field 705 and sequence/function field 707.

The array broken flag 603 is used to test disk integrity in a disk array. The array broken flag 603 is binary 0 to denote a normal disk array and is binary 1 to denote an abnormal disk array with removed or damaged disk. The array type field 605 is used for interface card to identify disk array type such as RAID 0, RAID 1, RAID 2, RAID 0+1, etc. The array serial number field 607 is used to identify the categories of disk arrays in the multiple disk-array system. The stripe size field 609 to is used to indicate different data units for data stripe such as 4 k, 8 k, 16 k, 32 k, or 64 k. The available capacity field 611 is used to indicate the disk capacity available for the disk array. For RAID 1 array, the available capacity field is the capacity of the disk with the smallest capacity.

When a disk array has bootable function, the bootable field 701 of the first disk is stored with binary 1, and the bootable fields 701 of other disks are stored with binary 0. If a disk is to be enhanced, the enhanced field 703 of the disk is recorded with binary 1. The serial check sum field 705 is used to record the serial check sum of a disk and can be used to compare with the serial check sum field of other disks in the same array. The sequence/function field 707 is used to record the sequence and function of disk in different arrays. For example, in the RAID 0, it denotes the disk sequence in the array. In the RAID 1 array, it denotes the disk being a source, mirror, or spare disk, and denotes the necessity for synchronization or not.

To sum up, the disk administrating system for multiple disk-arrays according to the present invention can be advantageously used to manage the multiple disk-array system. The disk with the inventive disk configuration can be used in disk array or span array in flexible way without the risk of data damage.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A disk administrating system for disks in multiple disk-arrays containing at least one disk array, comprising:
   a computer having an interface card;
   a plurality of disk drives connected to said interface card;
      wherein said plurality of disk drives constitute at least one disk array, each of said disk drives having an array configuration sector located at a last of a plurality of sectors thereof;
   wherein said computer accesses said disk drives through said interface card and manages said disk array by information stored in said array configuration sector, said array configuration sector having a field identifying said disk drive as being part of a particular array, a disk array firmware identification field, an array information field, a disk information field, a first serial checksum and a second checksum, said first serial checksum being based on a model number, a serial number and a disk drive firmware revision number encoded in said disk information field, said second serial checksum being based on said fields of said array configuration sector, said computer identifying disk data directly from said serial checksum.

2. The disk administrating system as in claim 1, wherein said array information field comprises bits defining at least an array type, a disk number, a stripe size and an available capacity.

3. The disk administrating system as in claim 2, wherein said array information field further comprises an array broken flag to check said integrity of said array.

4. The disk administrating system as in claim 2, wherein said array information field further comprises bits defining an array serial number to identify arrays of different types.

5. The disk administrating system as in claim 1, wherein said disk information field includes at least a bootable field.

6. The disk administrating system as in claim 1, wherein said disk information field includes at least a sequence/function field.

7. The disk administrating system as in claim 1, wherein said disk information field includes at least an enhanced field.

* * * * *